United States Patent
Hsu

(10) Patent No.: US 8,781,225 B2
(45) Date of Patent: Jul. 15, 2014

(54) AUTOMATIC TONE MAPPING METHOD AND IMAGE PROCESSING DEVICE

(71) Applicant: NOVATEK Microelectronics Corp., Hsin-Chu (TW)

(72) Inventor: Wei Hsu, Taoyuan County (TW)

(73) Assignee: NOVATEK Microelectronics Corp., Hsinchu Science Park, Hsin-Chu (TW)

( * ) Notice: Subject to any disclaimer, the term of this patent is extended or adjusted under 35 U.S.C. 154(b) by 65 days.

(21) Appl. No.: 13/674,098

(22) Filed: Nov. 12, 2012

(65) Prior Publication Data

US 2013/0121576 A1    May 16, 2013

(30) Foreign Application Priority Data

Nov. 14, 2011   (TW) .............................. 100141486 A

(51) Int. Cl.
   *G06K 9/00*    (2006.01)
(52) U.S. Cl.
   USPC .......................................... 382/167; 382/168
(58) Field of Classification Search
   None
   See application file for complete search history.

(56) References Cited

U.S. PATENT DOCUMENTS

| 5,808,697 | A * | 9/1998 | Fujimura et al. | 348/672 |
| 8,248,492 | B2 * | 8/2012 | Mitsunaga | 348/252 |
| 2007/0092136 | A1 * | 4/2007 | Zhao et al. | 382/169 |
| 2007/0229863 | A1 * | 10/2007 | Ono et al. | 358/1.9 |
| 2007/0269132 | A1 * | 11/2007 | Duan et al. | 382/274 |
| 2010/0080459 | A1 * | 4/2010 | Dai et al. | 382/170 |
| 2010/0157078 | A1 * | 6/2010 | Atanassov et al. | 348/222.1 |
| 2010/0278423 | A1 * | 11/2010 | Itoh et al. | 382/169 |
| 2011/0317936 | A1 * | 12/2011 | Takamura et al. | 382/274 |

* cited by examiner

Primary Examiner — Li Liu
(74) Attorney, Agent, or Firm — Winston Hsu; Scott Margo

(57) ABSTRACT

A tone-mapping method for adjusting a contrast of an image includes generating a luminance histogram of the image according to a luminance and a sharpness of the image; performing histogram equalization on the luminance histogram, to generate a luminance mapping function corresponding to the image; performing a weighted operation on the luminance mapping function and a linear function, to generate a weighted luminance mapping function corresponding to the image; generating a tone-mapping look-up table corresponding to the image according to the weighted luminance mapping function; and adjusting the luminance of the image according to the tone-mapping look-up table, so as to adjust the contrast of the image.

8 Claims, 6 Drawing Sheets

Luminance histogram
H_LUM(x)

AUTOMATIC TONE MAPPING METHOD AND IMAGE PROCESSING DEVICE

BACKGROUND OF THE INVENTION

1. Field of the Invention

The present invention relates to a tone mapping method and image processing device, and more particularly, to a tone mapping method and image processing device capable of adjusting image contrast according to both image luminance and sharpness, and controlling the degree of image adjustment via a weighted operation.

2. Description of the Prior Art

Digital images can be post-processed to attain more ideal image characteristics. For example, when capturing images using a digital camera, under-exposure and low overall image contrast may occur due to a lack of ambient lighting. To correct for this, conventional tone mapping techniques can respectively map each luminance value in the image to a new luminance value to adjust the overall contrast of the image. Image equalization is one example of a conventional tone mapping method that can achieve ideal image contrast by redistributing luminance values in an image, such that the luminance values are evenly spread over a luminance range. Conventional image equalization, however, simply brightens the relatively high luminance values in the image and darkens the relative low luminance values; therefore, over-compensation often occurs, meaning bright areas may be over-exposed or dark areas under-exposed. This results in a loss of detail in those areas.

Conventional equalization also cannot control different degrees of adjustment for parts having different sharpness values in an image, which often results in a visibly discontinuous contour effect in the processed image. Users also need to manually modify image characteristics such as S-curves to change a dynamic range of the image if the level of tone mapping adjustment needs to be adjusted, which is time-consuming and inconvenient.

Therefore, the conventional image tone mapping method needs improvement.

SUMMARY OF THE INVENTION

A primary objective of the present invention is to provide a tone mapping method and image processing device.

An embodiment of the invention discloses a tone mapping method for adjusting a contrast of an image, the method comprising: generating a luminance histogram of the image according to a luminance and a sharpness of the image; performing a histogram equalization operation on the luminance histogram to generate a luminance mapping function corresponding to the image; performing a weighted operation on the luminance mapping function and a linear function to generate a weighted luminance mapping function corresponding to the image; generating a tone mapping look-up table corresponding to the image according to the weighted luminance mapping function; and adjusting the luminance of the image according to the tone mapping look-up table, so as to adjust the contrast of the image.

Another embodiment of the invention discloses an image processing device, comprising: an image receiving unit, for receiving an image; a processing unit; and a storage unit, for storing a program code, the program code for instructing the processing unit to execute the following steps: generating a luminance histogram of the image according to a luminance and a sharpness of the image; performing a histogram equalization operation on the luminance histogram to generate a luminance mapping function corresponding to the image; performing a weighted operation on the luminance mapping function and a linear function to generate a weighted luminance mapping function corresponding to the image; generating a tone mapping look-up table corresponding to the image according to the weighted luminance mapping function; and adjusting the luminance of the image according to the tone mapping look-up table, so as to adjust the contrast of the image.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
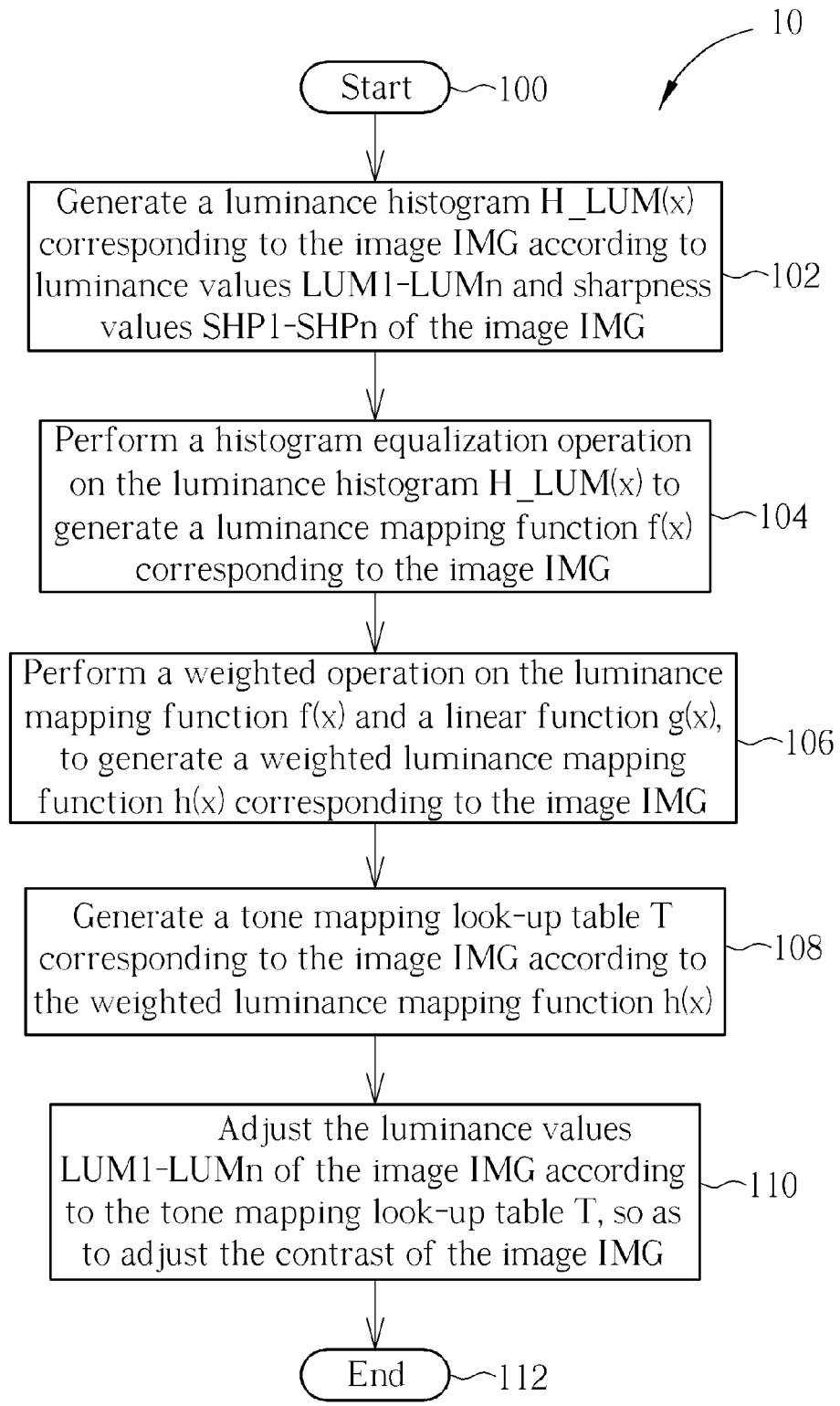
FIG. 1 is a schematic diagram of a process according to an embodiment of the invention.

Please refer to FIG. 1, which is a schematic diagram of a tone mapping process 10 according to an embodiment of the present invention. The tone mapping process 10 is used for adjusting contrast of an image IMG, and includes the following steps:

Step 100: Start.

Step 102: Generate a luminance histogram $H\_LUM(x)$ corresponding to the image IMG according to luminance values LUM1-LUMn and sharpness values SHP1-SHPn of the image IMG.

Step 104: Perform a histogram equalization operation on the luminance histogram $H\_LUM(x)$ to generate a luminance mapping function $f(x)$ corresponding to the image IMG.

Step 106: Perform a weighted operation on the luminance mapping function $f(x)$ and a linear function $g(x)$, to generate a weighted luminance mapping function $h(x)$ corresponding to the image IMG.

Step 108: Generate a tone mapping look-up table T corresponding to the image IMG according to the weighted luminance mapping function $h(x)$.

Step 110: Adjust the luminance values LUM1-LUMn of the image IMG according to the tone mapping look-up table T, so as to adjust the contrast of the image IMG.

Step 112: End.

According to process 10, the present invention first generates the luminance histogram $H\_LUM(x)$ corresponding to probabilistic distributions of different luminance values and sharpness values of the image IMG to perform equalization on the luminance histogram $H\_LUM(x)$. A luminance mapping function $f(x)$ can be obtained to convert the luminance of the image IMG, such that different luminance values in the image IMG are evenly distributed. Furthermore, weighted operation is performed on the luminance mapping function $f(x)$ and another linear function $g(x)$, to obtain a weighted luminance mapping function h(x). The linear function g(x) corresponds to a luminance mapping function which does not perform conversion (e.g. g(x)=x); namely, a luminance value k remains its original value after passing through the function g(x). As such, it is possible to control a degree of adjustment for an image via using different weighting factors. Finally, it is possible to generate a tone mapping look-up table T according to the weighted luminance mapping function h(x), composed of a new luminance value that each luminance value in the image should be mapped to, in order to facilitate subsequent luminance adjustment of each pixel of the image IMG to adjust the contrast of the image IMG via a table look-up.

In the conventional image equalization techniques, the degree of image adjustment cannot be controlled according to image detail, and issues such as over-compensation or loss of details in bright/dark portions of the image can easily occur. In contrast, the tone mapping process 10 of the present invention adds image sharpness information, and performs a weighted operation on the luminance mapping function. Therefore, when adjusting images for contrast, it is possible to control different degrees of image adjustment according to image detail, and prevent over-compensation or loss of detail.

Figure 2A:
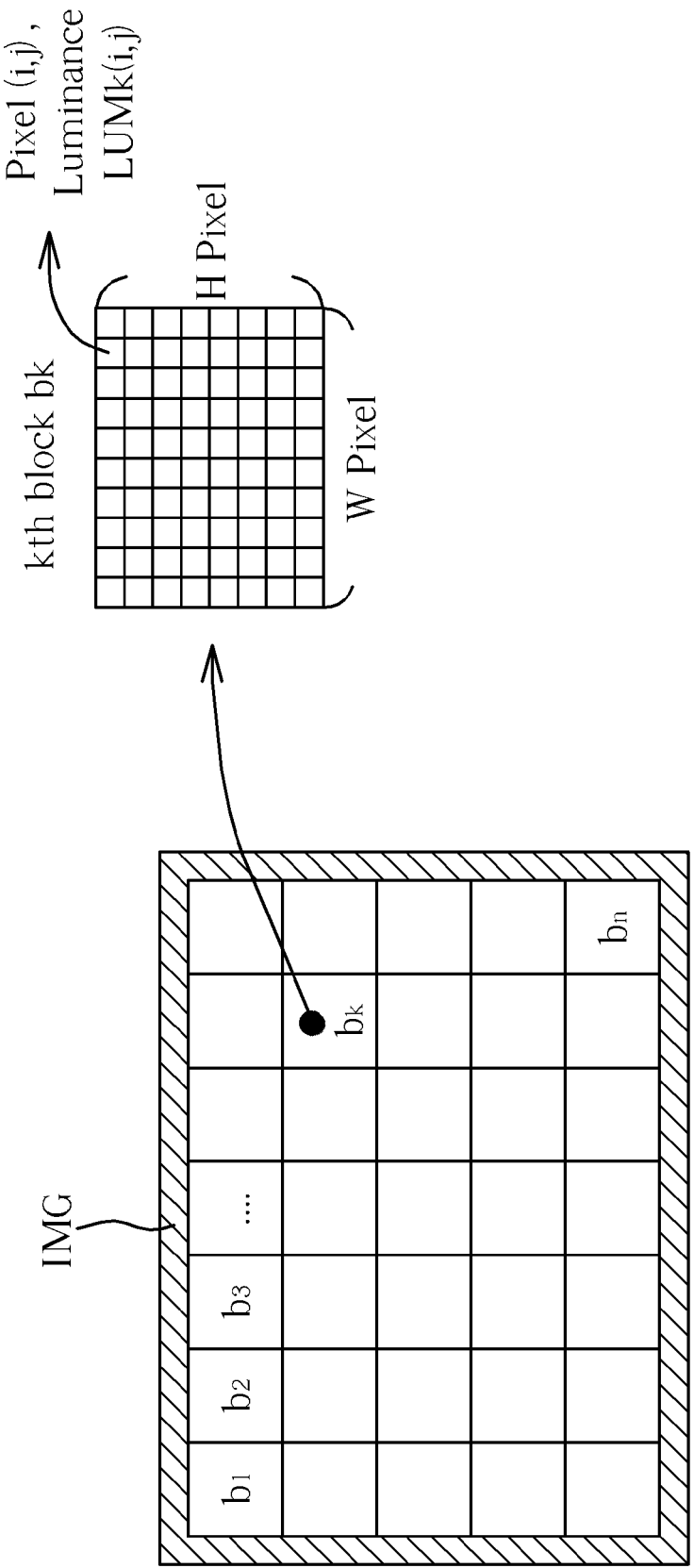
FIG. 2A is a schematic diagram of an image divided into multiple blocks according to an embodiment of the invention.

In more detail, in Step 102, the luminance values LUM1-LUMn and the sharpness values SHP1-SHPn of the image IMG are luminance information and sharpness information corresponding to each pixel of the image IMG, respectively, and have values within a specific range, such as an interval [0, 255]. Preferably, as shown in FIG. 2A, it is possible to first divide the image IMG into n blocks b1-bn when calculating the luminance and sharpness of the image IMG, wherein each block has a width W pixels and a height H pixels. LUMk (i, j) represents the luminance value of the pixel at position (i, j) in the k-th block bk. An average luminance value of all pixels in the block bk is then calculated to obtain a block average luminance AvgLUMk=Σ(LUMk (i, j))/(W*H) of the block bk. A block average sharpness AvgSHPk is an average value of absolute luminance value differences between all neighboring pixels in the block bk, and may be calculated as AvgSHPk=Σ(|LUMk (i, j)−LUMk(i+1, j+1)|)/(W*H). The block average luminance values AvgLUM1-AvgLUMn and block average sharpness values AvgSHP1-AvgSHPn of the n blocks b1-bn in the image IMG represent the luminance values LUM1-LUMn and sharpness values SHP1-SHPn of the image IMG, respectively. As such, it is not necessary to perform individual operations on each pixel of the image IMG: block average values may be utilized to represent the individual pixels instead, thereby greatly reducing operation overhead, and also filtering out unnecessary image noise interference.

Figure 2B:
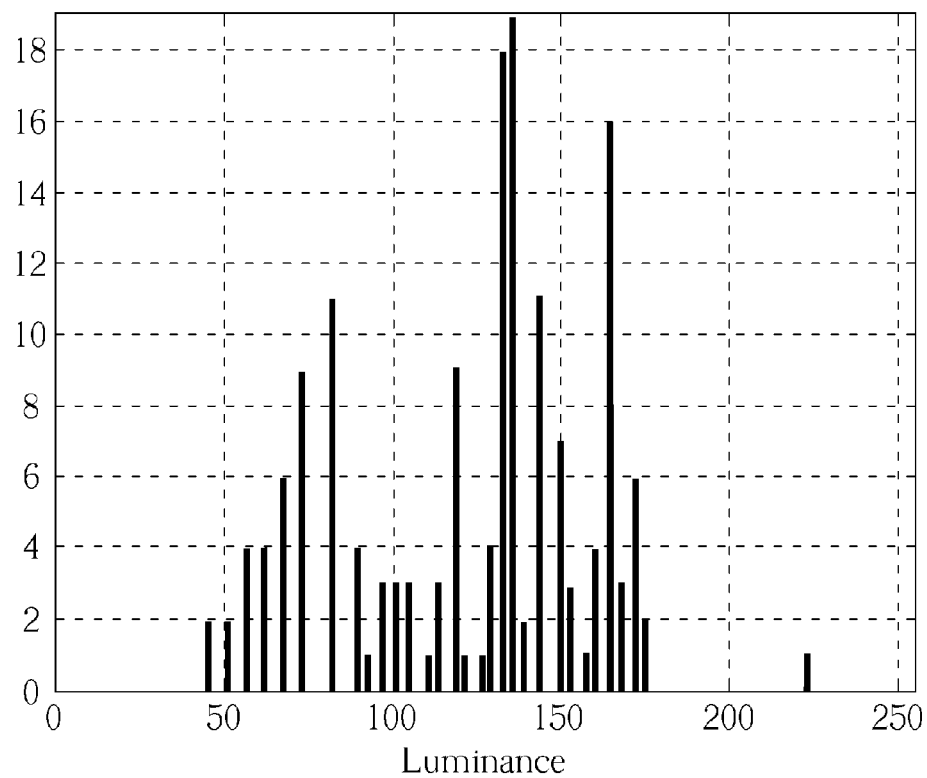
FIG. 2B is a schematic diagram of a luminance histogram according to an embodiment of the invention.

A block average luminance histogram H_AvgLUM(x) and a block average sharpness histogram H_AvgSHP(x) of the image IMG may be obtained via calculating the probability distribution of the luminance values LUM1-LUMn and the sharpness values SHP1-SHPn in the image IMG. In the block average luminance histogram H_AvgLUM(x) and the block average sharpness histogram H_AvgSHP(x), the horizontal axis is the luminance value interval [0-255], and the vertical axis is the number of blocks. The block average luminance histogram H_AvgLUM(x) and the block average sharpness histogram H_AvgSHP(x) represent probabilistic distributions of each luminance value and sharpness value in the image IMG, respectively. In an embodiment, it is possible to sum the average luminance histogram H_AvgLUM(x) and the block average sharpness histogram H_AvgSHP(x) to obtain the luminance histogram H_LUM(x) corresponding to the image IMG, as shown in FIG. 2B. As such, the luminance histogram H_LUM(x) simultaneously contains luminance and sharpness information of the image IMG, thus allowing different degrees of adjustment and compensation to be performed on blocks with different luminance and sharpness values. Enhanced detail control is therefore possible.

Figure 2C:
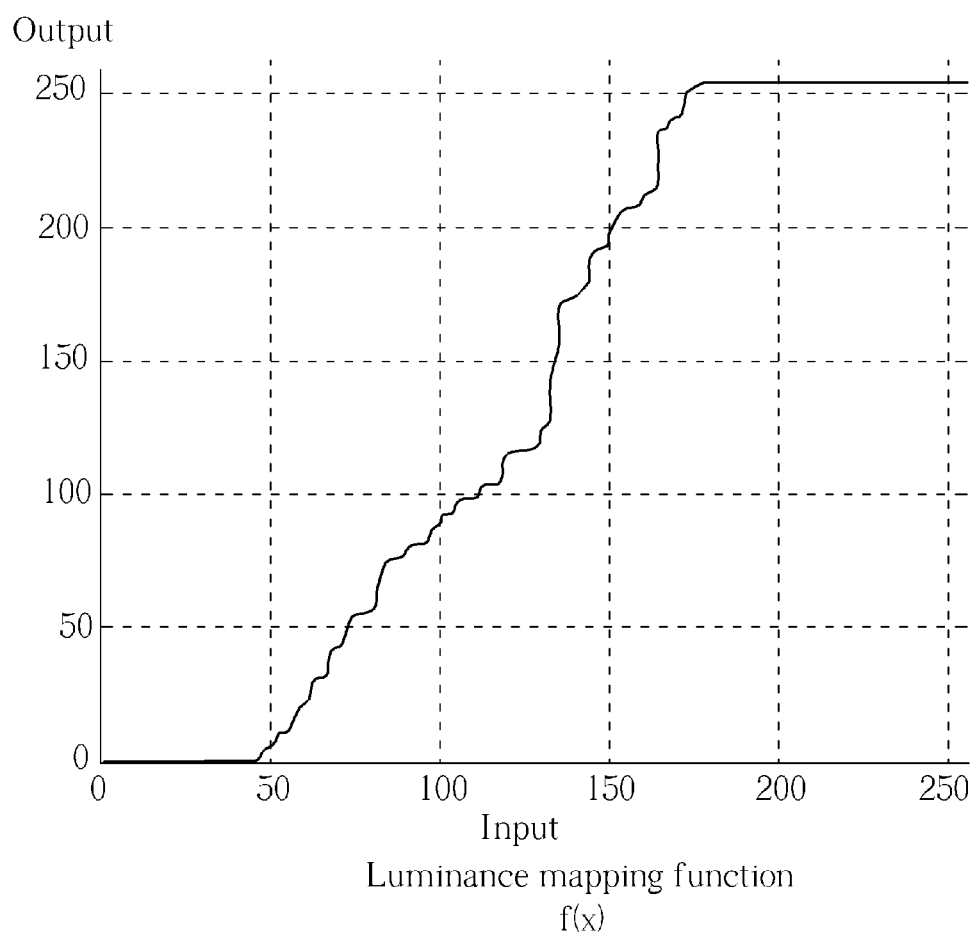
FIG. 2C is a schematic diagram of a luminance mapping function according to an embodiment of the invention.

In Step 104, a histogram equalization operation is performed on the luminance histogram H_LUM(x) to generate the luminance mapping function f(x) corresponding to the image IMG. First, the number of blocks in the luminance histogram H_LUM(x) may be cumulatively added along a direction of the horizontal axis (direction of increasing luminance value) to form a cumulative distribution luminance function CDF_LUM(x), wherein when x=255, the value of the cumulative distribution luminance function CDF_LUM (255) corresponds to a total number of blocks in the image IMG. Next, as shown in FIG. 2C, the range of values of the cumulative distribution luminance function CDF_LUM(x) may be normalized to a luminance value interval [0, 255] via conventional equalization operations to obtain a luminance mapping function f(x)=CDF_LUM(x)*(255/CDF_LUM (255)). The luminance mapping function f(x) can be used to perform a mapping-conversion on the luminance value of each pixel in the image IMG to obtain a contrast-adjusted image IMG'. In other words, for a specific luminance value k, f(k) maps to the new luminance value after luminance conversion is performed on the luminance value k. With FIG. 2C as an example, a pixel originally having a luminance value of 150 in the image IMG would have a converted pixel luminance value of 200 in the adjust image IMG'. The equalization operations performed on the luminance histogram via forming the cumulative distribution luminance function should be familiar to those skilled in the art, and are therefore not detailed here.

Figure 3:
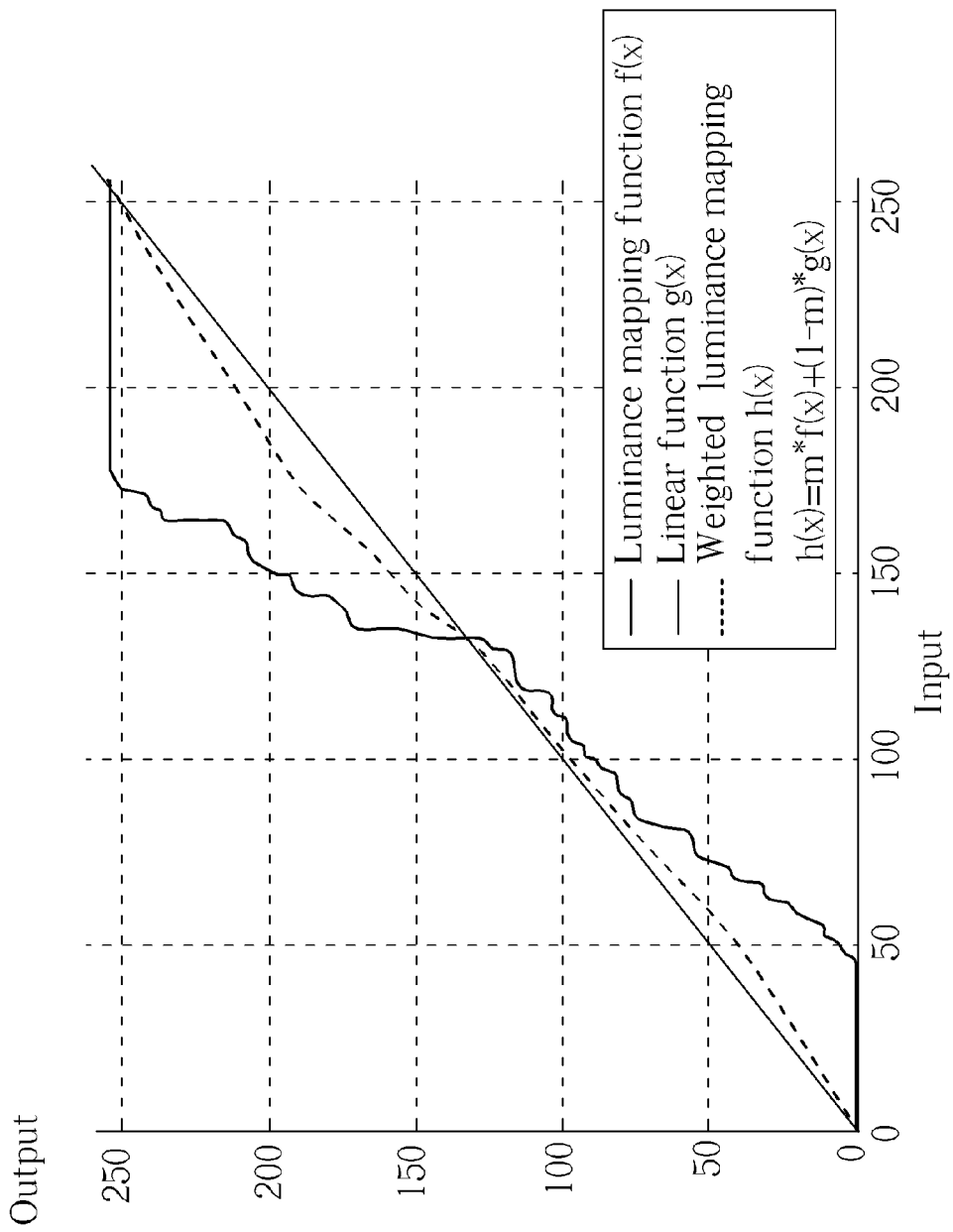
FIG. 3 is a schematic diagram of performing a weighted operation on the luminance mapping function shown in FIG. 2C to generate a weighted luminance mapping function.

In an embodiment of the invention, the weighted operation performed on the luminance mapping function f(x) and the linear function g(x) in Step 106 may be a weighted sum operation. Namely, the luminance mapping function f(x) and the linear function g(x) are multiplied by two different weighting factors, respectively, and then summed to obtain the weighted luminance mapping function h(x), as shown in FIG. 3. Specifically, a sum of the two weighting factors should be a constant value, e.g. 1. The linear function g(x) corresponds to a luminance mapping function via in which no conversion is performed, e.g. g(x)=x. The weighted luminance mapping function h(x) may be expressed as follows:

$$h(x)=f(x)*m+x*(1-m)$$

wherein m is the weighting factor between 0-1 corresponding to the luminance mapping function f(x), and (1−m) is the weighting factor of the linear function g(x). In the example shown in FIG. 3, the weighting factor m of the luminance mapping function f(x) is around 0.2, but can also be any arbitrary value. Therefore, it is possible to vary the degree of adjustment for the image IMG via controlling different values for the weighting factor m. When the weighting factor m equals zero, the weighted luminance mapping function h(x) equals the linear function g(x), and thus h(x) is equivalent to not performing any luminance conversion. If the weighting factor m=1, then the weighted luminance mapping function h(x) equals the linear function f(x); in this case h(x) corresponds to a maximum degree of adjustment, which is equivalent to performing the conventional equalization operation on the image IMG.

Finally, in Step 108, a tone mapping look-up table T corresponding to the image is generated according to the weighted luminance mapping function h(x). The tone mapping look-up table T is composed of new luminance values to which each of the luminance values in the interval [0-255]

should be mapped. In other words, a look-up result h(k) corresponding to a luminance value k in the tone mapping look-up table T is the new luminance value that the luminance value k maps to after image adjustment. According to the tone mapping look-up table T, after luminance adjustment has been performed on all pixels of the image IMG, the image IMG' having the adjust contrast may be obtained.

In another embodiment, when generating the tone mapping look-up table T corresponding to the image IMG according to the weighted luminance mapping function h(x), it is further possible to perform a smoothing operation on the look-up table T, such that the adjusted image IMG' may be smoothed, and the contour effect of conventional method may be eliminated as a result. The smoothing operation includes a sub-sampling operation and an interpolation operation. Via the sub-sampling operation, it is possible to filter out values with greater variances in the look-up table T. Via the interpolation operation, a value with smaller variance is interpolated at the filtered out points in the look-up table T. For example, x1, x2, and x3 are three consecutive luminance values in the tone mapping look-up table T, which correspond to three different adjusted luminance values h(x1), h(x2), and h(x3), respectively. A high disparity between a difference value between h(x1), h(x2) and between h(x2), h(x3) would indicate that h(x2) is a point of relatively high image variance. In such a case, adjusted luminance value h(x2) corresponding to the luminance value x2 may be discarded from the look-up table T, and a replacement value of (h(x3)−h(x1))/2 is inserted into the look-up table T. Therefore, after interpolation, the adjusted luminance values h(x1), h(x2), and h(x3) corresponding to the three consecutive luminance values x1, x2, and x3 would have a smaller variance, and the resulting adjusted image IMG' would appear smoother.

Figure 4:
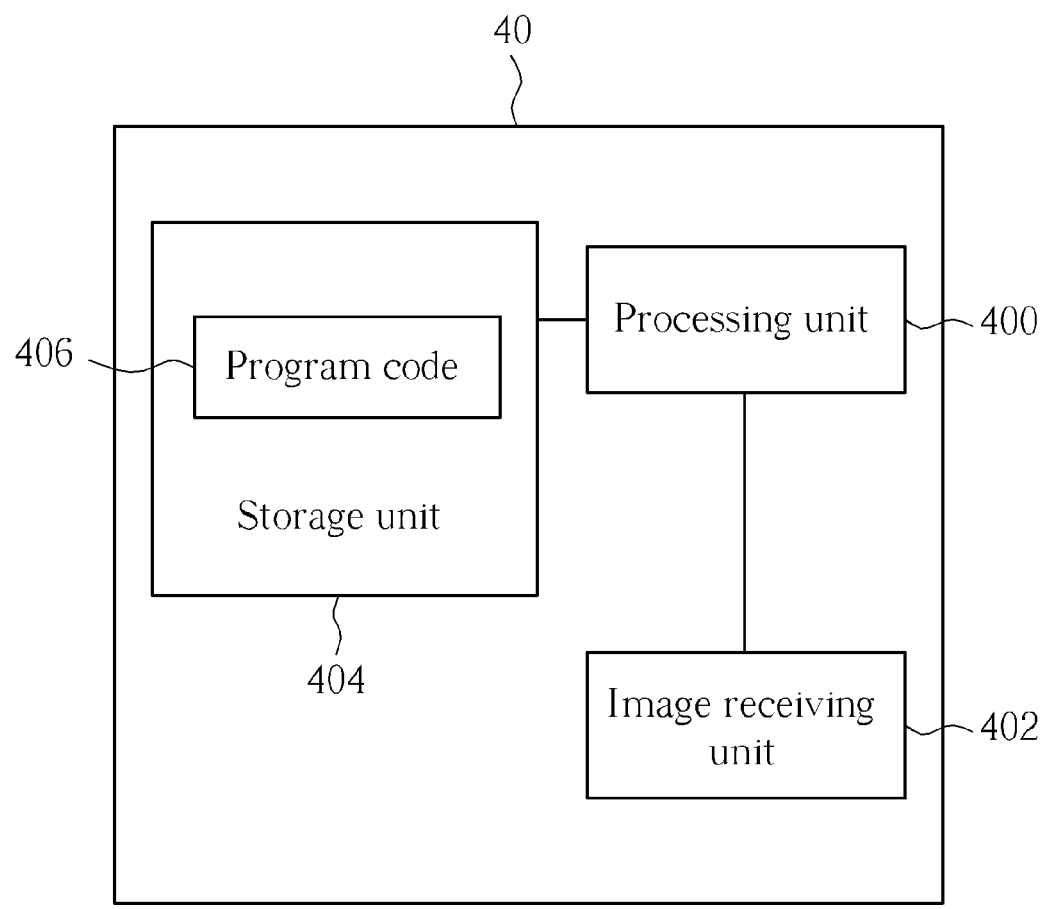
FIG. 4 is a schematic diagram of an image processing device according to an embodiment of the invention.

Each step of the tone mapping process 10 may be implemented by being compiled into a corresponding program code for implementing a related image processing device. Please refer to FIG. 4, which is a schematic diagram of an image processing device 40 according to an embodiment of the invention. The image processing device 40 includes a processing unit 400, an image receiving unit 402, a storage unit 404, and a program code 406. The program code 406 is stored in the storage unit 404, and is used to implement the tone mapping process 10 to instruct the processing unit 400 to execute corresponding functionalities and related variations of the tone mapping process 10, and process the image IMG received by the image receiving unit 402. Implementation of the tone mapping process 10 via the program code 406 should be well-known to those skilled in the art, and is not detailed here. Note that the processing unit 400, the image receiving unit 402, and the storage unit 404 of the image processing device 40 may be implemented via hardware, software, or firmware, though it is not limited thereto. The image processing device 40 may be utilized in electronic products such as digital cameras, mobile phones, digital display chips, or television display chips. The image receiving unit 402 may be an image sensing component such as a charge-coupled device (CCD).

Note that the spirit of the present invention is to perform equalization according to both the luminance and sharpness of the image, in order to enhance control over adjusting image details, and to allow variable degree of contrast adjustment via weighted operation, to prevent over-compensation or loss of detail in conventional equalization techniques. Furthermore, it is also possible to employ block operation and table-lookup conversion in the present invention, to reduce operation overhead and enhance processing speed. Also, a smoothing operation may be added to the look-up table, such that the adjusted image is smoother, and does not exhibit the contour effect as in conventional equalization. Those skilled in the art may make suitable modifications or variations accordingly.

The present invention as detailed above performs equalization operation according to luminance and sharpness values of an image, but it is also possible to include other image characteristics, such as white balance, etc., to achieve different image effects. Also, generating the luminance histogram of the image according to both luminance and sharpness values is not limited to directly summing the average luminance histogram and the average sharpness histogram, but may also be achieved via other operations (e.g. a weighted sum operation), as long as the operation takes multiple image characteristics of the image into account. Furthermore, the present invention uses absolute luminance difference between neighboring pixels in the image to measure the sharpness of the image, but is not limited thereto. Any value capable of indicating a varying degree of detail in an image may be used as an indicator for sharpness. The weighting factor m may be selected as a constant value, but is not limited thereto. For instance, when the overall image luminance and sharpness is lower than a specific value, a higher weighting factor m may be automatically selected to increase the degree of adjustment. It is also possible to provide a means for users to manually adjust the weighting factor m. In the embodiment of the invention, linear interpolation is used for the smoothing operation, but other interpolation methods are possible (e.g. a higher degree non-linear interpolation), as long as the luminance mapping function can be smoothed to have smaller variations.

In summary, in the conventional image equalization techniques, the degree of image adjustment cannot be controlled according to image detail, and over-compensation or loss of bright/dark image detail can occur. In contrast, the present invention can adjust image contrast according to both luminance and sharpness information of the image, and perform a weighted operation on the luminance mapping function, and it is therefore possible to control different degrees of image adjustment according to image detail, and prevent over-compensation or loss of detail.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A tone mapping method for adjusting a contrast of an image, the method comprising:
generating a luminance histogram of the image according to a luminance and a sharpness of the image, wherein the step of generating the luminance histogram of the image according to the luminance and the sharpness of the image comprises:
dividing the image into a plurality of blocks;
calculating an average luminance of pixels in each block of the plurality of blocks, respectively, to generate a block average luminance histogram corresponding to the plurality of blocks;
calculating an average sharpness of pixels in each block of the plurality of blocks, respectively, to generate a block average sharpness histogram corresponding to the plurality of blocks; and
summing the block average luminance histogram and the block average sharpness histogram to generate the luminance histogram corresponding to the image;

performing a histogram equalization operation on the luminance histogram to generate a luminance mapping function corresponding to the image;

performing a weighted operation on the luminance mapping function and a linear function to generate a weighted luminance mapping function corresponding to the image;

generating a tone mapping look-up table corresponding to the image according to the weighted luminance mapping function; and adjusting the luminance of the image according to the tone mapping look-up table, so as to adjust the contrast of the image.

2. The tone mapping method of claim 1, wherein the step of performing the weighted operation on the luminance mapping function and the linear function to generate the weighted luminance mapping function corresponding to the image comprises:

multiplying the luminance mapping function by a first weighting factor to generate a first weighted luminance mapping function;

multiplying the linear function by a second weighting factor to generate a second weighted luminance mapping function; and summing the first weighted luminance mapping function and the second weighted luminance mapping function to generate the weighted luminance mapping function;

wherein a sum of the first weighting factor and the second weighting factor is a constant value.

3. The tone mapping method of claim 1, wherein the step of generating the tone mapping look-up table corresponding to the image according to the weighted luminance mapping function comprises:

performing a smoothing operation on the weighted luminance mapping function to generate a smoothed luminance mapping function; and generating the tone mapping look-up table according to the smoothed luminance mapping function.

4. The tone mapping method of claim 3, wherein the step of performing the smoothing operation on the weighted luminance mapping function to generate the smoothed luminance mapping function comprises:

performing a sub-sampling operation on the weighted luminance mapping function to generate a sub-sampled luminance mapping function; and performing an interpolation operation on the sub-sampled luminance mapping function to generate the smoothed luminance mapping function.

5. An image processing device, comprising:

an image receiving unit, for receiving an image;

a processing unit; and a storage unit, for storing a program code, the program code for instructing the processing unit to execute the following steps:

generating a luminance histogram of the image according to a luminance and a sharpness of the image,
wherein when generating the luminance histogram the program code further instructs the processing unit to:

divide the image into a plurality of blocks;

calculate an average luminance of pixels in each block of the plurality of blocks, respectively, to generate a block average luminance histogram corresponding to the plurality of blocks;

calculate an average sharpness of pixels in each block of the plurality of blocks, respectively, to generate a block average sharpness histogram corresponding to the plurality of blocks; and sum the block average luminance histogram and the block average sharpness histogram to generate the luminance histogram corresponding to the image;

performing a histogram equalization operation on the luminance histogram to generate a luminance mapping function corresponding to the image;

performing a weighted operation on the luminance mapping function and a linear function to generate a weighted luminance mapping function corresponding to the image;

generating a tone mapping look-up table corresponding to the image according to the weighted luminance mapping function; and adjusting the luminance of the image according to the tone mapping look-up table, so as to adjust the contrast of the image.

6. The image processing device of claim 5, wherein the program code further instructs the processing unit to:

multiply the luminance mapping function by a first weighting factor to generate a first weighted luminance mapping function;

multiply the linear function by a second weighting factor to generate a second weighted luminance mapping function; and sum the first weighted luminance mapping function and the second weighted luminance mapping function to generate the weighted luminance mapping function;

wherein a sum of the first weighting factor and the second weighting factor is a constant value.

7. The image processing device of claim 5, wherein the program code further instructs the processing unit to:

perform a smoothing operation on the weighted luminance mapping function to generate a smoothed luminance mapping function; and generate the tone mapping look-up table according to the smoothed luminance mapping function.

8. The image processing device of claim 7, wherein the program code further instructs the processing unit to:

perform a sub-sampling operation on the weighted luminance mapping function to generate a sub-sampled luminance mapping function; and perform an interpolation operation on the sub-sampled luminance mapping function to generate the smoothed luminance mapping function.

* * * * *